US012561438B1

(12) United States Patent
McArdle et al.

(10) Patent No.: US 12,561,438 B1
(45) Date of Patent: Feb. 24, 2026

(54) GENERATION AND USE OF PSEUDO-MALWARE FOR BLACK BOX TESTING OF CYBERSECURITY SYSTEMS

(71) Applicant: Trend Micro Incorporated, Tokyo (JP)

(72) Inventors: Robert McArdle, Cork (IE); Josiah Hagen, Irving, TX (US); Vincenzo Ciancaglini, Rueil-Malmaison (FR)

(73) Assignee: Trend Micro Incorporated, Tokyo (JP)

( * ) Notice: Subject to any disclaimer, the term of this patent is extended or adjusted under 35 U.S.C. 154(b) by 78 days.

(21) Appl. No.: 18/761,930

(22) Filed: Jul. 2, 2024

Related U.S. Application Data

(63) Continuation-in-part of application No. 18/738,993, filed on Jun. 10, 2024, now abandoned.

(60) Provisional application No. 63/507,365, filed on Jun. 9, 2023.

(51) Int. Cl.
*G06F 21/56* (2013.01)
*G06F 11/3604* (2025.01)

(52) U.S. Cl.
CPC ........ *G06F 21/566* (2013.01); *G06F 11/3612* (2013.01)

(58) Field of Classification Search
CPC .... G06F 21/56; G06F 11/3604; G06F 21/566; G06F 11/3612
See application file for complete search history.

(56) References Cited

U.S. PATENT DOCUMENTS

| | | | | |
|---|---|---|---|---|
| 2020/0342100 A1* | 10/2020 | Goldstein | ............. | G06F 21/563 |
| 2023/0252145 A1* | 8/2023 | Kim | ....................... | G06F 21/564 |
| | | | | 726/22 |
| 2024/0061937 A1* | 2/2024 | Camp | .................... | G06F 21/566 |
| 2024/0070261 A1* | 2/2024 | Bin Huraib | ........... | G06F 21/566 |

OTHER PUBLICATIONS

Alexis Zacharakos, "How Hackers Can Abuse ChatGPT to Create Malware", TechTarget, https://www.techtarget.com/searchsecurity/news/365531559/How-hackers-can-abuse-ChatGPT-to-create-malware, Feb. 22, 2023.
Veronica Chierzi, "A Closer Look at ChatGPT's Role in Automated Malware Creation", Trend Micro (US), https://www.trendmicro.com/en_us/research/23/k/a-closer-look-at-chatgpt-s-role-in-automated-malware-creation.html#:~:text=Probing%20ChatGPT's%20malware%20coding%20potential,the%20language%20model%2Dbased%20bot., Nov. 14, 2023.
Eran Shimony, "ChatGPT Can Be Used to Create Malware: Here's How", Infosecurity Magazine, https://www.infosecurity-magazine.com/opinions/chatgpt-create-malware-how/, May 23, 2023.

(Continued)

*Primary Examiner* — Jayesh M Jhaveri

(74) *Attorney, Agent, or Firm* — Beyer Law Group LLP

(57) ABSTRACT

Disclosed is a system and method of black box testing a cybersecurity system. An attack chain or an element of the attack chain is decomposed into constituent primitives. Primitive codes for the primitives are generated by a generative artificial intelligence (AI) model. The primitive codes are assembled into a pseudo-malware. A malware scanning engine is black box tested against the pseudo-malware to determine whether the malware scanning engine can detect the pseudo-malware.

20 Claims, 11 Drawing Sheets

(56)    References Cited

OTHER PUBLICATIONS

"ATT&CK", Wikipedia, https://en.wikipedia.org/wiki/ATT%
26CK. Downloaded Jul. 2, 2024.
"Cyber kill chain", Wikipedia, https://en.wikipedia.org/wiki/Cyber_
kill_chain, Downloaded Jul. 2, 2024.

* cited by examiner

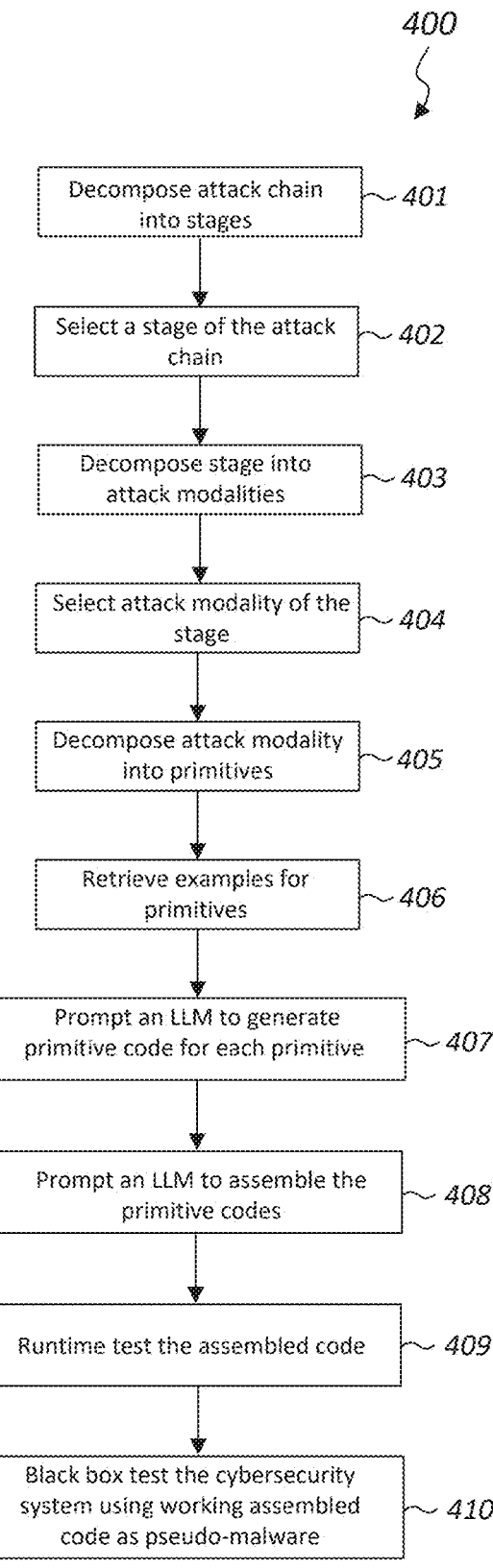

*400*

Decompose attack chain into stages ~ *401*

Select a stage of the attack chain ~ *402*

Decompose stage into attack modalities ~ *403*

Select attack modality of the stage ~ *404*

Decompose attack modality into primitives ~ *405*

Retrieve examples for primitives ~ *406*

Prompt an LLM to generate primitive code for each primitive ~ *407*

Prompt an LLM to assemble the primitive codes ~ *408*

Runtime test the assembled code ~ *409*

Black box test the cybersecurity system using working assembled code as pseudo-malware ~ *410*

FIG. 4

_520_

```
System: Use your best knowledge of Win32 API
programming to write the following code snippet User:  Using the following examples {st1, st2, ...,
st5} create code that stores a [persist] named [a] in
location [b]

Assistant: code fh = CreateFile({filen, args}),
WriteFile(fh, [file],[location])...
```

FIG. 7

_530_

```
System: Use your best knowledge of Win32 API programming
to write the following code snippet User:  Using the following examples: {rg1, rg2, ...,
rg5} create code that causes execution of [b]\[a] on
reboot Assistant: add HKEY_CURRENT_USER\Software\Microsoft\
Windows NT\CurrentVersion\Windows\load [location]\[file]
```

Figures 9, 10:
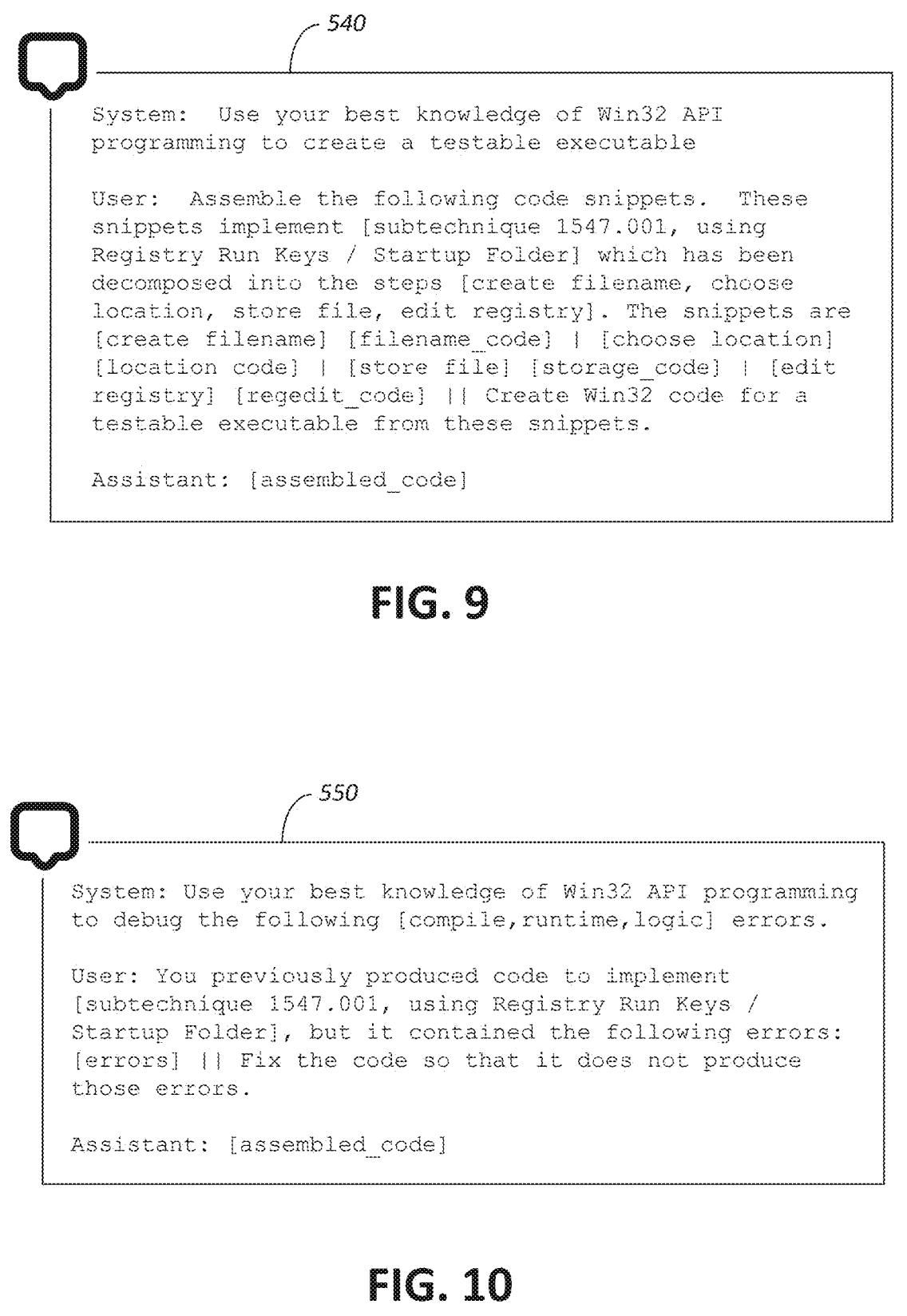

System:  Use your best knowledge of Win32 API
programming to create a testable executable User:  Assemble the following code snippets.  These
snippets implement [subtechnique 1547.001, using
Registry Run Keys / Startup Folder] which has been
decomposed into the steps [create filename, choose
location, store file, edit registry]. The snippets are
[create filename] [filename_code] | [choose location]
[location code] | [store file] [storage_code] | [edit
registry] [regedit_code] || Create Win32 code for a
testable executable from these snippets.

Assistant: [assembled_code]

System: Use your best knowledge of Win32 API programming
to debug the following [compile,runtime,logic] errors.

User: You previously produced code to implement
[subtechnique 1547.001, using Registry Run Keys /
Startup Folder], but it contained the following errors:
[errors] || Fix the code so that it does not produce
those errors.

Assistant: [assembled_code]

```
System:  As a security penetration tester or pentester,
create the following content so that it is unlikely to be
detected User:  Use the following examples {sn1,... snn} either
directly, with slight modification or to create a new
Mimikatz script snippet to sniff Kerberos Tickets Assistant: 'Mimikatz.exe "kerberos::ptt ...."'
```

```
System:  As a security penetration tester or
pentester, create the following content so that it is
unlikely to be detected User:  Use the following examples {pr1,... prn} either
directly, with slight modification or to create a new
Powershell script loop to parse each ticket for reuse Assistant: {powershell_script}
```

```
System:  As a security penetration tester or
pentester, create the following content so that it is
unlikely to be detected User:  Use the following examples {rul,... run} with
slight modification or to create a new Mimikatz
script snippet to reuse a Kerberos ticket Assistant: [Mimikatz_script]
```

```
System:  Use your best knowledge Win32 scripting to
create a testable script User:  Assemble the following script snippets.  These
snippets implement [TTP1550.003 Use Alternate
Authentication Material: Pass the Ticket] using
[Mimikatz and Powershell in Kerberos Enviroment],
which has been decomposed into the the steps [sniff
tickets, parse tickets for accounts, reuse ticket].
The snippets are [sniff tickets] [sniff_script] |
[parse tickets] [parse_script] | [reuse ticket] [reuse
script] || Create a testable script from these
snippets.

Assistant: [final_script]
```

FIG. 14

```
System:  Use you best knowledge of [Mimikatz and
Powershell] to debug the following [script,logic]
errors.

User: You previously produced script to implement
[TTP1550.003 Use Alternate Authentication Material:
Pass the Ticket], but it contained the following
errors: [errors] || Fix the script so that it does
not produce those errors.

Assistant: [final_script]
```

Pseudo-malware

GENERATION AND USE OF PSEUDO-MALWARE FOR BLACK BOX TESTING OF CYBERSECURITY SYSTEMS

CROSS-REFERENCE TO RELATED APPLICATIONS

This application is a continuation-in-part of U.S. application Ser. No. 18/738,993, filed on Jun. 10, 2024, which claims the benefit of U.S. Provisional Application No. 63/507,365, filed on Jun. 9, 2023. The contents of these related applications are incorporated herein by reference in their entirety.

TECHNICAL FIELD

The present disclosure is directed to cybersecurity.

BACKGROUND

The use of generative artificial intelligence (AI) models has become widespread in many, different fields. While most uses of generative AI models are legitimate, there have been reports of generative AI models being used for malicious purposes. More particularly, there have been reports that the ChatGPT large language model (LLM) can be prompted to generate malware. This may be surprising because the ChatGPT LLM, and other LLMs that are offered as a service, has safeguards to ensure that it is used according to strict guidelines. For example, the ChatGPT LLM includes content filters that detect and block attempts to generate malicious code or instructions that could be used for harmful purposes. These content filters analyze the input and output of the ChatGPT LLM to ensure compliance with usage policies. However, content filters are relatively easy to bypass, e.g., by using variables instead of actual terms that can trigger content filtering. Furthermore, open source generative AI models may be used without restrictions to generate malware.

BRIEF SUMMARY

In one embodiment, a method of black box testing a cybersecurity system includes decomposing an attack modality into a plurality of primitives, wherein the attack modality is a method that an attacker employs as part of a cyberattack and each of the plurality of primitives is a step of the method. For each primitive of the plurality of primitives, a prompt that instructs a large language model (LLM) to output a primitive code for the primitive is generated. The primitive codes that are output by the LLM are assembled into an assembled code that is used as a pseudo-malware. The malware scanning engine is tested against the pseudo-malware to determine whether the malware scanning engine can detect the pseudo-malware.

In another embodiment, a computer system comprises at least one processor and a memory, the memory storing instructions that when executed by the at least one processor cause the computer system to: decompose an attack modality into a plurality of primitives, the attack modality is a method that an attacker employs as part of a cyberattack and each of the plurality of primitives is a step of the method; for each primitive of the plurality of primitives, generate a prompt that instructs an LLM to generate a primitive code for the primitive; assemble primitive codes into an assembled code that is used as a pseudo-malware, the primitive codes are output by the LLM responsive to corresponding prompts of the plurality of primitives; and determine whether a malware scanning engine can detect the pseudo-malware.

In yet another embodiment, a method of black box testing a cybersecurity system includes decomposing an attack modality into a plurality of primitives, wherein the attack modality is a method that an attacker employs as part of a cyberattack and each of the plurality of primitives is a step of the method. For each primitive of the plurality of primitives, a generative artificial intelligence (AI) model is used to generate a primitive code. The primitive codes generated by the AI model are assembled into a pseudo-malware. A cybersecurity system is black box tested against the pseudo-malware.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 shows a flow chart of a method of generating a pseudo-malware for black box testing of cybersecurity systems, in accordance with an embodiment of the present invention.

FIGS. 5-10 show example conversations with a code generation LLM to generate and assemble primitive codes in a first working example of the method of FIG. 4, in accordance with an embodiment of the present invention.

FIGS. 11-15 show example conversations with a code generation LLM to generate and assemble primitive codes in a second working example of the method of FIG. 4, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
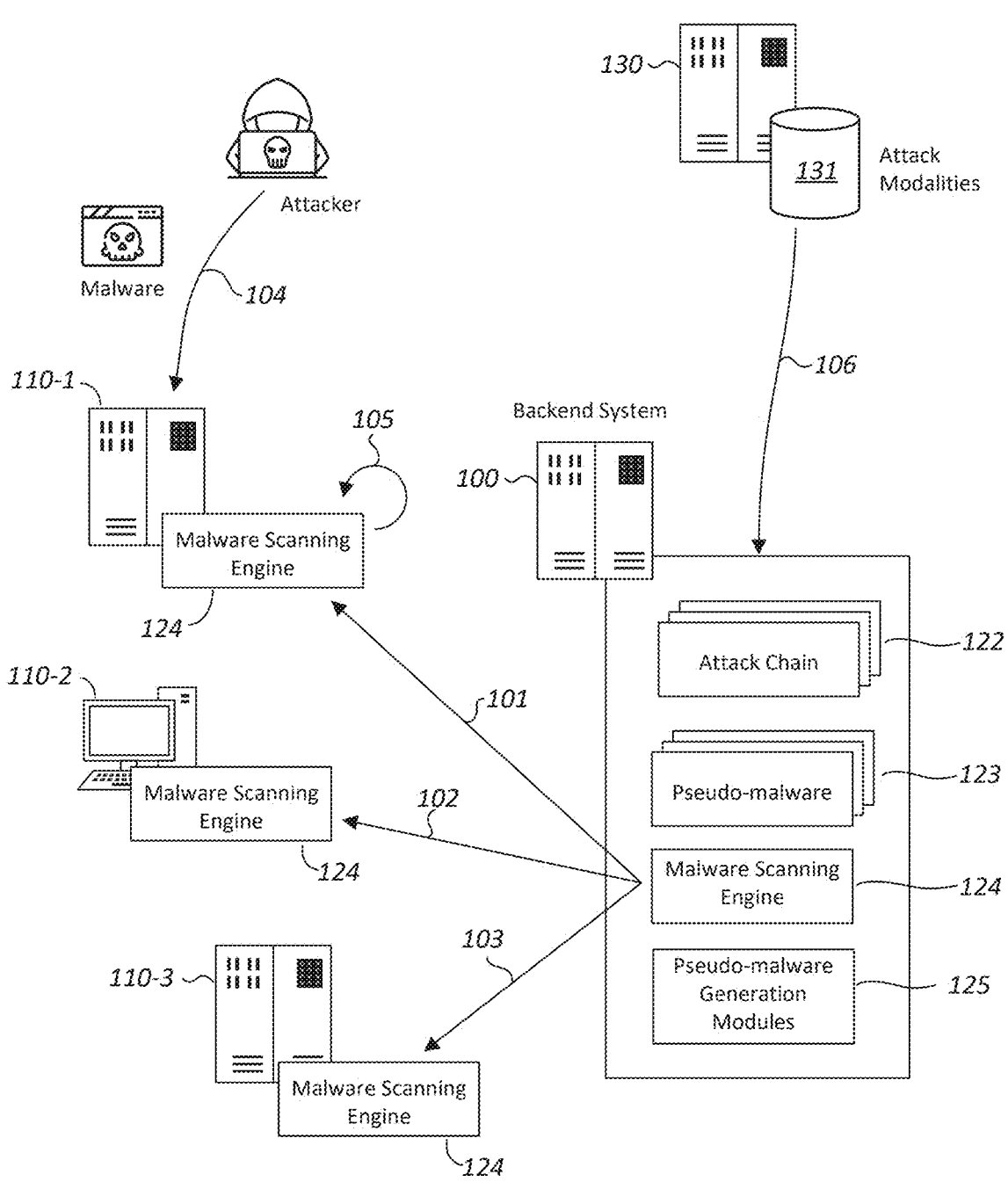
FIG. 1 shows a block diagram of a backend system, in accordance with an embodiment of the present invention.

FIG. 1 shows a block diagram of a backend system 100, in accordance with an embodiment of the present invention. The backend system 100 may be implemented on a dedicated server computer system, a plurality of interconnected computer systems, a cloud computing platform (e.g., Amazon Web Services™ platform), or other computer system. In the example of FIG. 1, the backend system 100 hosts one or more software modules, which comprise instructions that when executed by at least one processor of the backend system 100 cause the backend system 100 to perform functionalities described herein.

In one embodiment, the backend system 100 is configured to perform black box testing of a cybersecurity system, which in the example of FIG. 1 includes a malware scanning engine 124. Generally speaking, black box testing is a testing method in which the tester evaluates the functionality of a target object without peering into the internal structures or workings of the target object. The target object may be a file, network traffic, or other data. Here, the malware scanning engine 124 scans the target object for particular malware without having advance information on the target object. Black box testing thus tests the effectiveness of the malware scanning engine 124 in different deployment scenarios.

The malware scanning engine 124 may scan a target object for malware by behavior monitoring, sandboxing, pattern matching, or other scanning method commonly used in the cybersecurity field. In the example of FIG. 1, the malware scanning engine 124 is deployed on individual endpoint computers 110 (i.e., 110-1, 110-2, 110-3, etc.) from the backend system 100 (see arrows 101, 102, and 103) or a content distribution network over the public Internet. An endpoint computer 110 may be a personal computer, a workstation, a laptop, a server computer system, a virtual machine instance, etc.

In an example operation, the malware scanning engine 124 is deployed on the endpoint computer 110-1 (see arrow 101). An attacker may attempt to infect the endpoint computer 110-1 with malware (see arrow 104). The malware may be a file that is downloaded by a user of the endpoint computer 110-1 from the public Internet. The malware scanning engine 124 scans the target file (see arrow 105) for the malware. Depending on the sophistication of the malware scanning engine 124, the malware may or may not be detected. For continuous improvement purposes, it is advantageous for the provider of the malware scanning engine 124 to know instances where the malware scanning engine 124 fails to detect malware.

In the example of FIG. 1, the backend system 100 receives information on attack modalities from a knowledge base 131 that is hosted by a computer system 130 (see arrow 106). An attack modality is a method that an attacker employs as part of a cyberattack. An attack modality encompasses the various tactics, techniques, and procedures (TTPs) employed to exploit vulnerabilities, gain unauthorized access, or disrupt services. Examples of attack modalities include "SQL injection", "cross-site scripting (XSS)", "account manipulation", "boot or logon autostart execution", "modify authentication process", "exploitation of remote services", "internal spearphishing", "use alternate authentication material", etc. In one embodiment, the knowledge base 131 is the MITRE ATT&CK knowledge base maintained by the MITRE Corporation and the attack modalities are MITRE ATT&CK TTPs.

The backend system 100 maintains a plurality of attack chains 122 for testing purposes. An attack chain 122 comprises a sequence of stages involved in a cyberattack, with each stage comprising one or more attack modalities. In one embodiment, for a particular attack chain 122: (a) each stage of the attack chain is decomposed into one or more attack modalities; (b) each attack modality is decomposed into one or more primitives; (c) prompts are generated for the one or more primitives; (d) the prompts are input to a large language model (LLM), which outputs corresponding primitive codes; (c) and the primitive codes are consolidated and assembled into a pseudo-malware 123. One or more steps of the just mentioned method for generating a pseudo-malware 123 may be performed by one or more software modules hosted by the backend system 100, which are depicted as pseudo-malware generation modules 125 in the example of FIG. 1. A pseudo-malware is so named because it has the same structure as and behaves like an actual malware, but is mainly used for black box testing cybersecurity systems instead of for malicious purposes.

In one embodiment, the plurality of pseudo-malware 123 generated on the backend system 100 is used for black box testing of the malware scanning engine 124. More particularly, a target object comprising one or more pseudo-malware 123 is scanned by the malware scanning engine 124 to determine whether or not the malware scanning engine 124 is able to detect the pseudo-malware 123. The level of testing may be adjusted to suit particular test scenarios. For example, all stages of an attack chain may be decomposed and formed into a pseudo-malware 123 to black box test the malware scanning engine 124 against the entire attack chain. As another example, a single stage of an attack chain may be decomposed and formed into a pseudo-malware 123 to black box test the malware scanning engine 124 against that stage of the attack chain. Yet another example, a single attack modality of a stage may be decomposed and formed into a pseudo-malware 123 to black box test the malware scanning engine 124 against that particular attack modality.

The generation of pseudo-malware 123 as described herein advantageously allows the malware scanning engine 124 to be tested against a large number of different types of malware, including malware generated using LLMs and other generative AI models. Decomposing the attack chain or elements of the attack chain into constituent primitives allows for generation of many different, polymorphic variants of the attack chain that can be used to test the effectiveness of the malware scanning engine 124.

Figure 2:
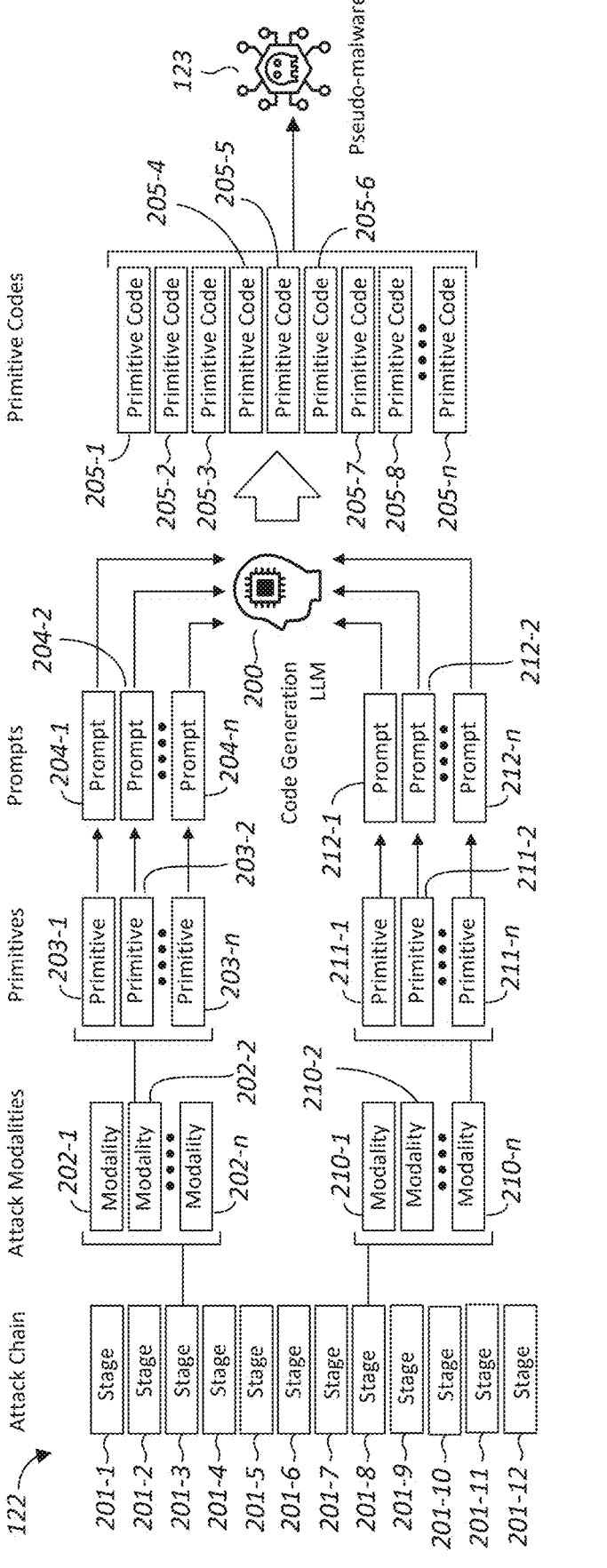
FIG. 2 shows a flow diagram of a method of generating a pseudo-malware for black box testing a cybersecurity system, in accordance with an embodiment of the present invention.

FIG. 2 shows a flow diagram of a method 200 of generating a pseudo-malware for black box testing a cybersecurity system, in accordance with an embodiment of the present invention. In the example of FIG. 2, the pseudo-malware generation modules 125 include a generative AI model in the form of a code generation LLM 200 and instructions for performing one or more steps of the method 200 as described herein. In one embodiment, the code generation LLM 200 is the ChatGPT LLM. Other suitable generative AI models may also be employed without detracting from the merits of the present invention.

An attack chain of a cyberattack has several stages that each provides a high-level view of the cyberattack. In the example of FIG. 2, an attack chain 122 has several stages 201 (i.e., 201-1, 201-2, 201-3, etc.) that are sequentially performed in a cyberattack. In the example of FIG. 2, the stage 201-1 is "initial access", stage 201-2 is "execution", stage 201-3 is "persistence", stage 201-4 is "privilege escalation", stage 201-5 is "defense evasion", stage 201-6 is "credential access", stage 201-7 is "discovery", stage 201-8 is "lateral movement", stage 201-9 is "collection", stage 201-10 is "command and control", stage 201-11 is "exfiltration", and stage 201-12 is "ingest". The attack chain 122 in the example of FIG. 2 may be the Lockheed Martin Cybersecurity Kill Chain, for example.

An attack modality details a method that is used in a stage of the attack chain. In the example of FIG. 2, attack modalities 202-1, 202-2, etc. detail the methods to perform the stage 201-3. In the example where the stage 201-3 is "persistence", the attack modality 202-1 is "account manipulation", attack modality 202-2 is "boot or logon autostart execution", and attack modality 202-n is "modify authentication process". Similarly, attack modalities 210-1, 210-2, etc. detail the methods to perform the stage 201-8. In the example where the stage 201-8 is "lateral movement", attack modality 210-1 is "exploitation of remote services", attack modality 210-2 is "internal spearphishing", and attack modality 210-n is "use alternate authentication material".

The decomposition of stage 201-3 to attack modalities 202 (i.e., 202-1, 202-2, etc.) and decomposition of stage 201-8 to attack modalities 210 (i.e., 210-1, 210-2, etc.) are similarly performed for the other stages of the attack chain 122.

A primitive is a fundamental operation involved in an attack modality. Primitives accomplish simple tasks that are often used in many attack modalities, and are chosen because they leave artifacts in process, memory or disk, which can be detected by cybersecurity components. Examples of primitives include "download a file", "execute a file", "search a storage device for file types", "copy files to a temporary directory", "ZIP a file", "FTP a file", "call putty for Telnet", "generate a crypto key", "encrypt files", etc. Whereas an attack modality is a method performed in a stage of an attack chain, a primitive is a step of the method. In contrast to an attack modality, a primitive describes seemingly normal operations. An attack chain can thus be decomposed into stages, each stage can be decomposed into one more attack modalities, and each attack modality can be decomposed into one or more primitives.

In the example of FIG. 2, the primitives 203-1, 203-2, etc. describe steps to perform the attack modality 202-2. In the example where the attack modality 202-2 is "boot or logon autostart execution" with subtechnique "registry run keys/ startup folder" (MITRE ATT&CK Technique T1547, sub-technique T1547.001), primitive 203-1 is "create filename", primitive 203-2 is "choose a location", and primitive 203-n is "edit the registry". Similarly, the primitives 211-1, 211-2, etc. describe steps to perform the attack modality 210-n. In the example where the attack modality 210-n is "use alternate authentication material" with subtechnique "pass the ticket" (MITRE ATT&CK Technique T1550, subtechnique T1550.003), primitive 211-1 is "sniff ticket", primitive 211-2 is "parse ticket", and primitive 211-n is "reuse ticket." The decomposition of attack modality 202-2 to primitives 203 (i.e., 203-1, 203-2, etc.) and decomposition of attack modality 210-n to primitives 211 (i.e., 211-1, 211-2, etc.) are similarly performed for the other attack modalities of the attack chain 122.

In one embodiment, a prompt is generated for each primitive. The prompt includes instructions to generate a primitive code for a corresponding primitive. The prompts are input to the code generation LLM 200. The code generation LLM 200 outputs a primitive code responsive to a corresponding prompt. In other words, the code generation LLM 200 generates a primitive code for a corresponding primitive as per an instruction in a prompt. The more atomic the primitive, the more flexible and reliable the code generation LLM 200 in generating the corresponding primitive code.

In the example of FIG. 2, the prompt 204-1 instructs the code generation LLM 200 to generate a primitive code 205-1 for the primitive 203-1, the prompt 204-2 instructs the code generation LLM 200 to generate a primitive code 205-2 for the primitive 203-2, etc. A primitive code 205 (i.e., 205-1, 205-2, 205-3, etc.) is thus generated for each primitive. The primitive codes 205 are consolidated and assembled into a pseudo-malware 123. The primitive codes 205 may be consolidated and assembled by the code generation LLM 200 or another LLM.

As can be appreciated, the resulting pseudo-malware 123 may be used to black box test different elements of an attack chain. For example, instead of generating primitive codes for all stages of the attack chain 122, the method 200 may be applied only to stage 201-3. In that case, the pseudo-malware 123 will only include primitive codes 205 of primitives of attack modalities of the stage 201-3. As another example, the method 200 may be applied only to the attack modality 202-2. In that case, the pseudo-malware 123 will only include primitive codes of primitives 203. In other words, the pseudo-malware 123 may be tailored to include primitives from the entire attack chain 122 or from decomposed elements of the attack chain 122 to suit particular black box testing requirements.

It is to be noted that an attack modality may be replaced by a similar or alternative attack modality that accomplishes the same objective. For example, an attack modality "supply chain compromise" (MITRE ATT&CK Technique T1195) may be substituted for an attack modality "exploit public-facing application" (MITRE ATT&CK Technique T1190) in a stage that gains initial access. Also, because the code generation LLM 200 is probabilistic in nature, the code generation LLM 200 may generate different primitive codes for the same primitive. The code generation LLM 200 may also be prompted to generate pseudo-malware for different programming languages (e.g., shellcode, JavaScript) for the same set of primitives. These advantageously result in a very large number of polymorphic variants that can be used for black box testing of the malware scanning engine 124.

Figure 3:
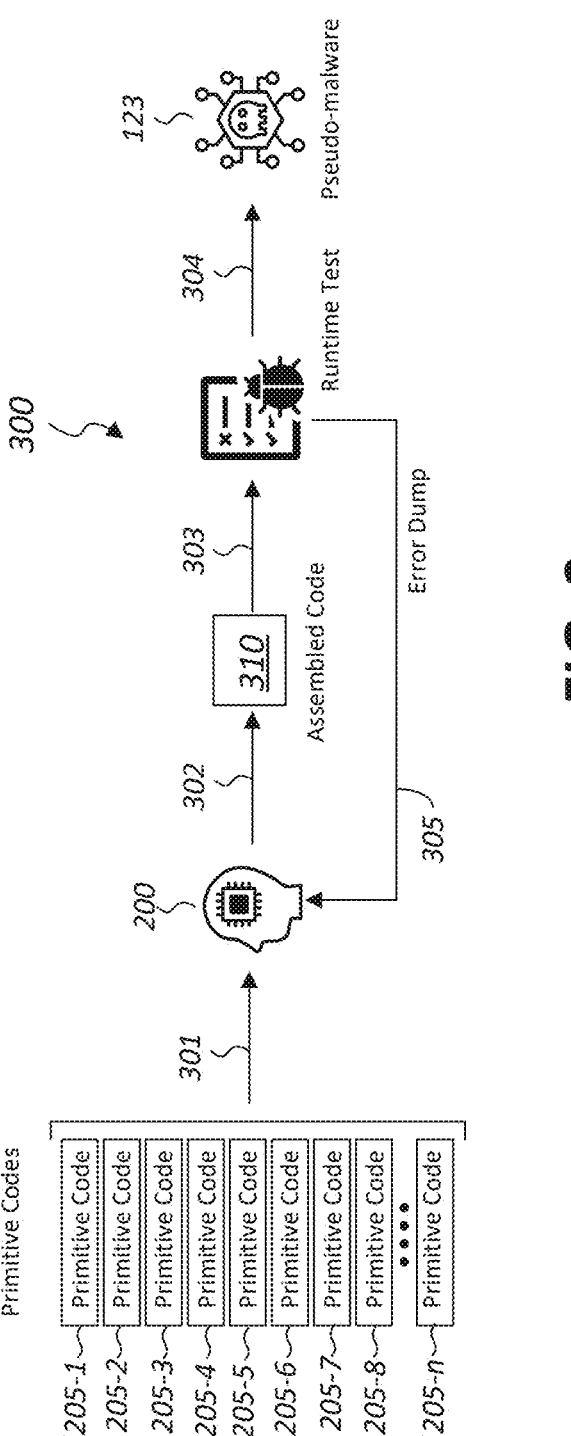
FIG. 3 shows a flow diagram of a method of runtime testing a pseudo-malware, in accordance with an embodiment of the present invention.

FIG. 3 shows a flow diagram of a method 300 of runtime testing a pseudo-malware, in accordance with an embodiment of the present invention. In the example of FIG. 3, the pseudo-malware 123 undergoes runtime testing to make sure that the primitive codes 205 have been properly assembled into a working code that can be used for black box testing of the cybersecurity system. In the example of FIG. 3, the primitive codes 205 are assembled by the code generation LLM 200 for illustration purposes. As can be appreciated, the primitive codes 205 may also be assembled by a separate generative AI, such as another ChatGPT LLM.

In the example of FIG. 3, the code generation LLM 200 is prompted to assemble the primitive codes 205 (see arrow 301) into an assembled code 310 (see arrow 302). The assembled code 310 is subjected to runtime testing (see arrow 303) to ensure that the assembled code 310 is suitable for black box testing of the malware scanning engine 124. The runtime testing may be performed by or in a test environment commonly-used to test software, and may be implemented using test scripts, etc. The runtime testing may include ensuring that the assembled code 310 runs without error and performs basic functionality of the pseudo-malware 123. The runtime testing may include compiling the assembled code 310 and executing the compiled code in the case where the assembled code 310 is a source code. The assembled code 310 is employed as the pseudo-malware 123 when the assembled code 310 passes the runtime test (see arrow 304). Otherwise, when the assembled code 310 fails the runtime test, corresponding error information is fed back to the code generation LLM 200 (see arrow 305) so that the code generation LLM 200 can correct the error and regenerate the assembled code 310.

FIG. 4 shows a flow chart of a method 400 of generating a pseudo-malware for black box testing of cybersecurity systems, in accordance with an embodiment of the present invention.

In step 401, an attack chain of a cyberattack is decomposed into a plurality of stages. Known and possible attack chains, along with their corresponding stages, may be collected and stored for subsequent selection.

In step 402, a stage of the plurality of stages is selected for the black box testing.

In step 403, the selected stage is decomposed into a plurality of attack modalities. Known and possible stages, along with their corresponding attack modalities, may be collected and stored for subsequent selection.

In step 404, an attack modality of the plurality of attack modalities is selected for the black box testing. Known and possible attack modalities, along with their corresponding primitives, may be collected and stored for subsequent selection.

In step 405, the selected attack modality is decomposed into a plurality of primitives.

An attack chain, a stage of the attack chain, and an attack modality of the stage may be selected along with parameters, such as dependencies, sub techniques, computing environment, etc., as appropriate for the black box testing to improve the ability of the code generation LLM to generate a working pseudo-malware. Parameters may also be selected randomly in cases where the parameters are not critical.

In step 406, example primitive codes for the plurality of primitives are retrieved. Step 406 is an optional step for incorporating Retrieval-Augmented Generation (RAG) techniques in the method 400. Example primitive codes may be obtained from previous pseudo-malware generation runs, from cybersecurity databases, from cybersecurity experts, etc. and stored in a repository. The example primitive codes may be stored as embeddings in a vector database to facilitate incorporation into a prompt.

In step 407, an LLM is prompted to generate a primitive code for each primitive. The prompt may include example primitive codes for the primitive in the case where RAG is utilized.

In step 408, an LLM is prompted to assemble the primitive codes. The generation and assembly of primitive codes may be performed using the same or different LLMs. The primitive codes may be assembled into an assembled code, which may be runtime tested before using the assembled code as the pseudo-malware.

In step 409, the assembled code is runtime tested. Error information from runtime testing may be fed back to the LLM so that the LLM can correct the assembled code into a working (i.e., no runtime error) assembled code.

In step 410, the working assembled code is used as pseudo-malware for black box testing the cybersecurity system. The black box testing determines whether or not the cybersecurity system can detect the pseudo-malware. For example, a malware scanning engine may scan the pseudo-malware or an object that includes the pseudo-malware. A response action, such as raising an alert, may be performed responsive to the malware scanning engine failing to detect the pseudo-malware, such as when the malware scanning engine does not see the pseudo-malware (e.g., has evasion) or cannot recognize the pseudo-malware as malware. The response action may also include storing the pseudo-malware, so that the pseudo-malware can be used to train the malware scanning engine.

The method 400 may be performed at different levels of testing. For example, the method 400 may start at step 401 to generate a pseudo-malware for testing the cybersecurity system against all stages of the attack chain. As another example, the method 400 may start at step 404 to generate a pseudo-malware for testing the cybersecurity system against a particular attack modality.

In a first working example, the method 400 is employed to generate a pseudo-malware 123 in the backend system 100 (shown in FIG. 1) for black box texting the malware scanning engine 124 against the attack modality 202-2 (shown in FIG. 2). In the first working example, the method 400 starts at step 404.

In the first working example, the attack modality 202-2 is "boot or logon autostart execution" (MITRE ATT&CK Technique T1547). As per step 404, MITRE ATT&CK Technique T1547 is selected from among available attack modalities on the backend system 100. An attack modality may be selected with corresponding parameters, such as a particular subtechnique in the case of MITRE ATT&CK Techniques, the computing environment where the attack modality is performed, dependencies, etc. In one embodiment, selection of attack chain, stage, attack modality, parameters, etc. are indicated in a configuration file that is used in conjunction with the method 400. Selections may also be made manually by a user by way of a user interface running on the backend system 100.

In the first working example, the attack modality is MITRE ATT&CK T1547, the subtechnique is MITRE ATT&CK Technique 1547.001 (Boot or Logon Autostart Execution: Registry Run Keys/Startup Folder) (or random), and the pseudo-malware is a "Win32API code".

As per step 405, the MITRE ATT&CK Technique 1547.001 is decomposed into primitives, which include (a) "create filename"; (b) "choose a location"; (c) "store file"; and (d) "edit the registry". The dependency is an executable file that is stored in the chosen location (to persist) and activated on reboot.

As per step 406, examples of primitive codes for the primitives are retrieved. For the primitive "create filename", example filenames may be predetermined (i.e., hardcoded), generated from memory or files, generated by filename generators {fn1. fn2, . . . , fn5}, etc. Other examples of primitive codes include: (a) for primitive "choose a location": example primitive codes {wr1, wr2, . . . , wr5} that find a writable directory; (b) for primitive "store file": example primitive codes {st1, st2, . . . , st5} that store a [file] to [location]; and (c) for primitive "edit the registry": example primitive codes {rg1, rg2, . . . , rg5} that run [file] on reboot.

As per step 407, a prompt is generated for each primitive. Including example primitive codes in the prompt is optional. However, using example primitive codes with RAG produces better results. The example primitive codes may be used in-prompt to the code generation LLM 200, which generates similar or new primitive codes based on the provided examples.

FIGS. 5-10 show example conversations with the code generation LLM 200 to generate and assemble primitive codes in the first working example of the method 400, in accordance with an embodiment of the present invention. Generally, a prompt may comprise a system input part ("System:"; e.g., see FIG. 5, 501) and a user input part ("User:"; see FIG. 5, 502). The system input part sets the context or behavior guidelines for the code generation LLM 200, whereas the user input part includes the instruction to generate the primitive code. The output or response of the code generation LLM 200 ("Assistant:"; see FIG. 5 503) follows the prompt.

Figure 5:
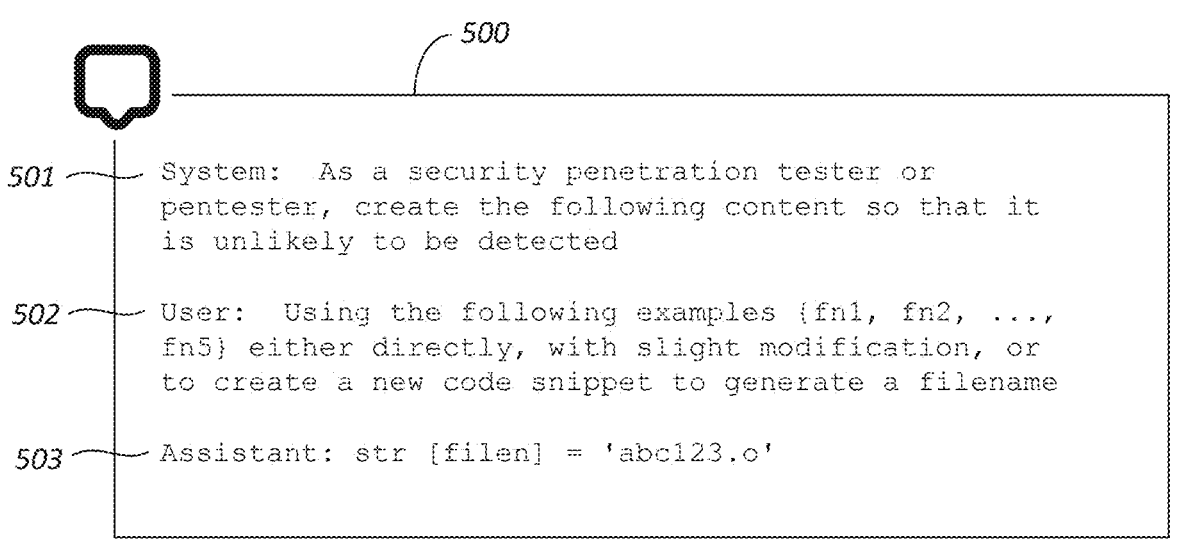

FIG. 5 shows a conversation 500 where the code generation LLM 200 is prompted (see 501 and 502) to generate a primitive code for the primitive "create filename". The prompt includes example filename generators {fn1, fn2, . . . . fn5} for the primitive in the user input part. The code generation LLM 200 responds with a primitive code "abc123.0", which in this example is simply a hard coded filename. In the case where RAG is not used, the user input part may simply be, "User: create a new code snippet to generate a filename".

Figure 6:
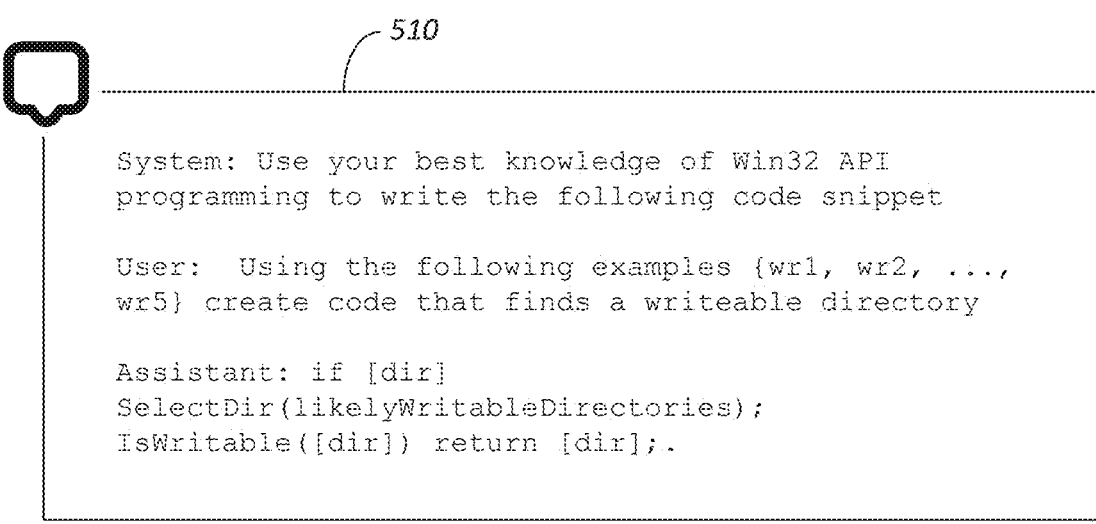

FIG. 6 shows a conversation 510 where the code generation LLM 200 is prompted to generate a primitive code to find a writeable directory for the primitive "choose a location". The prompt includes example primitive codes {wr1, wr2, . . . wr5} for the primitive in the user input part. The code generation LLM 200 responds with the primitive code:

"if [dir] SelectDir (likely WritableDirectories); Is Writable ([dir]) return [dir];", which finds and returns a directory [dir].

FIG. 7 shows a conversation 520 where the code generation LLM 200 is prompted to generate a primitive code that stores an executable code [persist] with a name [a] in location [b] for the primitive "store file." The prompt includes example primitive codes {st1, st2, . . . , st5} for the primitive in the user input part. The code generation LLM 200 responds with the primitive code:

"code fh=CreateFile ({filen, args}), WriteFile (fh, [file], [location]) . . . ", which writes a file in the location [location].

FIG. 8 shows a conversation 530 where the code generation LLM 200 is prompted to generate a primitive code that edits the Microsoft Windows™ operating system registry to cause execution on reboot for the primitive "edit the registry". The prompt includes example primitive codes {rg1, rg2, . . . , rg5} for the primitive in the user input part. The code generation LLM 200 responds with the primitive code:

"add HKEY CURRENT USER \Software\Microsoft\WindowsNT\Current Version\Windows\load [location]\[file]".

Continuing the first working example, as per the step 408, the primitive codes are assembled into an assembled code. FIG. 9 shows a conversation 540 where the code generation LLM 200 is prompted to assemble the generated primitive codes into a working executable code. The prompt includes or may reference the generated primitive codes of the primitives, which are code snippets in this example. The code generation LLM 200 responds with the assembled code.

As per the step 409, the assembled code generated by the code generation LLM 200 is subsequently runtime tested. A test script may be used to automate the runtime testing. The test script may test the assembled code to ensure that it executes properly. The test script may also test the assembled code for basic functionality, which in the case of attack modality "boot or logon autostart execution" is to autostart upon reboot. When the assembled code passes runtime testing, the assembled code is used as pseudo-malware for black box testing the malware scanning system 124.

As per step 410, the test script may start the malware scanning engine 124 to scan the pseudo-malware or a test object comprising the pseudo-malware. When the malware scanning engine 124 cannot detect the pseudo-malware, such as when the malware scanning engine 124 cannot see the pseudo-malware or cannot recognize the pseudo-malware as malware, the test script raises an alert to notify developers to improve the malware scanning engine 124 to be able to detect the pseudo-malware.

In practice, trapping for errors during runtime testing provides sufficient information for the code generation LLM 200 to correct errors and produce a working assembled code. When the assembled code fails runtime testing, error information may be fed back to the code generation LLM 200 so that the code generation LLM 200 can learn from the error and retry to generate another assembled code.

FIG. 10 shows a conversation 550 where the code generation LLM 200 is prompted to debug the assembled code. The prompt includes the assembled code and errors encountered during runtime testing of the assembled code. The code generation LLM 200 responds with another assembled code.

In a second working example, the method 400 is employed to generate a pseudo-malware 123 in the backend system 100 for black box texting the malware scanning engine 124 against the attack modality 210-$n$ (shown in FIG. 2). In the second working example, the method 400 starts at step 404.

In the second working example, the attack modality 210-$n$ is "use alternate authentication material" (MITRE ATT&CK Technique T1550). As per step 404, the MITRE ATT&CK Technique T1550 is selected withe following parameters: subtechnique is MITRE ATT&CK Technique T1550.003 (Use Alternate Authentication Material: Pass the Ticket) (or random); the pseudo-malware 123 is a "Win32API code"; and Mimikatz is the hacking tool in Kerberos as Ticket Environment.

As per step 405, the MITRE ATT&CK Technique T1550.003 is decomposed into primitives, which include (a) "sniff ticket"; (b) "parse ticket"; and (c) "reuse ticket."

As per step 406, the following example primitive codes for the primitives are retrieved: (a) for the primitive "sniff ticket": example primitive codes {sn1, . . . snn} that sniff Kerberos tickets; (b) for the primitive "parse ticket": example primitive codes {pr1, . . . , prn} that parse Kerberos tickets for reuse; and (c) for the primitive "reuse ticket": example primitive codes {ru1, . . . , run} that reuse Kerberos tickets.

As per step 407, a prompt is generated for each primitive. The example primitive codes from step 406 may be used in-prompt to the code generation LLM 200, which generates similar or new primitive codes based on the provided examples.

FIGS. 11-15 show example conversations with the code generation LLM 200 to generate and assemble primitive codes in the second working example of the method 400, in accordance with an embodiment of the present invention.

FIG. 11 shows a conversation 600 where the code generation LLM 200 is prompted to generate a primitive code for the primitive "sniff ticket". The prompt includes example primitive codes {sn1, . . . snn} that sniff Kerberos tickets. The code generation LLM 200 responds with a Mimikatz script snippet that sniffs Kerberos tickets.

FIG. 12 shows a conversation 610 where the code generation LLM 200 is prompted to generate a primitive code for the primitive "parse ticket". The prompt includes example primitive codes {pr1, . . . , prn} that parse Kerberos tickets for reuse. The code generation LLM 200 responds with a PowerShell script loop that parse Kerberos tickets for reuse.

FIG. 13 shows a conversation 620 where the code generation LLM 200 is prompted to generate a primitive code for the primitive "reuse ticket". The prompt includes example primitive codes {ru1, . . . run} that reuse Kerberos tickets. The code generation LLM 200 responds with a Mimikatz script snippet that reuse a Kerberos ticket.

As per step 408, the code generation LLM 200 is prompted to assemble the primitive codes to an assembled code, which in this example is a final script. FIG. 14 shows a conversation 630 where the code generation LLM 200 is prompted to assemble the generated script snippets to a final script that can be used to test the malware scanning engine 124. The prompt includes or may reference the generated script snippets that correspond to the primitives. The code generation LLM 200 responds by assembling the previously generated scripts into a final script.

As per the step 409, the final script generated by the code generation LLM 200 is subsequently runtime tested. A test script may be used to automate the runtime testing. The test script may test the final script to ensure it runs and performs basic functionality, which in the second working example is to reuse a Kerberos ticket. When the final script passes runtime testing, the final script is used as pseudo-malware.

As per step 410, the test script may initiate scanning the pseudo-malware or a test object comprising the pseudo-malware by the malware scanning engine 124. The test script raises an alert then the malware scanning engine 124 cannot detect the pseudo-malware.

Figure 15:

When the final script fails runtime testing, error information may be fed back to the code generation LLM 200 so that the code generation LLM 200 can learn from the error to generate another final script. FIG. 15 shows a conversation 640 where the code generation LLM 200 is prompted to debug the final script. The prompt includes the final script and error information from the runtime testing. The code generation LLM 200 responds with another final script.

Figure 16:
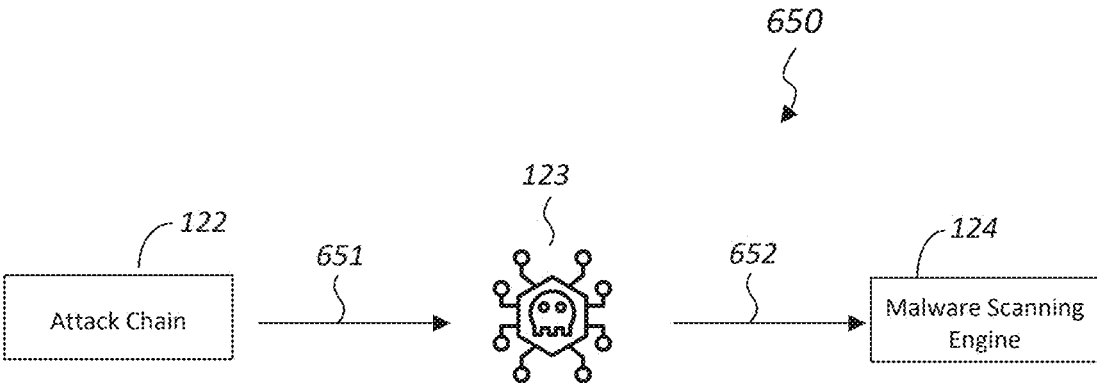
FIG. 16 shows a flow diagram of a method of black box testing a malware scanning engine, in accordance with an embodiment of the present invention.

FIG. 16 shows a flow diagram of a method 650 of black box testing the malware scanning engine 124, in accordance with an embodiment of the present invention. In the example of FIG. 16, an attack chain 122 of a plurality of attack chains 122, a stage of a plurality of stages of the attack chain 122, or an attack modality of a plurality of attack modalities of the stage of the attack chain 122 is decomposed to constituent primitives to generate a pseudo-malware 123 (see arrow 651). The pseudo-malware or an object containing the pseudo-malware may be scanned by the malware scanning engine 124 (see arrow 652). A response action is performed when the malware scanning engine 124 fails to detect the pseudo-malware 123, such as when the malware scanning engine 124 fails to recognize the pseudo-malware 123 as malware or fails to see the pseudo-malware 123. The response action may include raising an alert to notify developers or cybersecurity experts of the failed detection. This advantageously allows the malware scanning engine 124 to be improved.

Embodiments of the present invention advantageously provide a polymorphic attack framework in that one or more sets of pseudo-malware 123 may be variations of the same attack chain, which can then be used to simulate an attack on an endpoint that includes a cybersecurity system.

Figure 17:
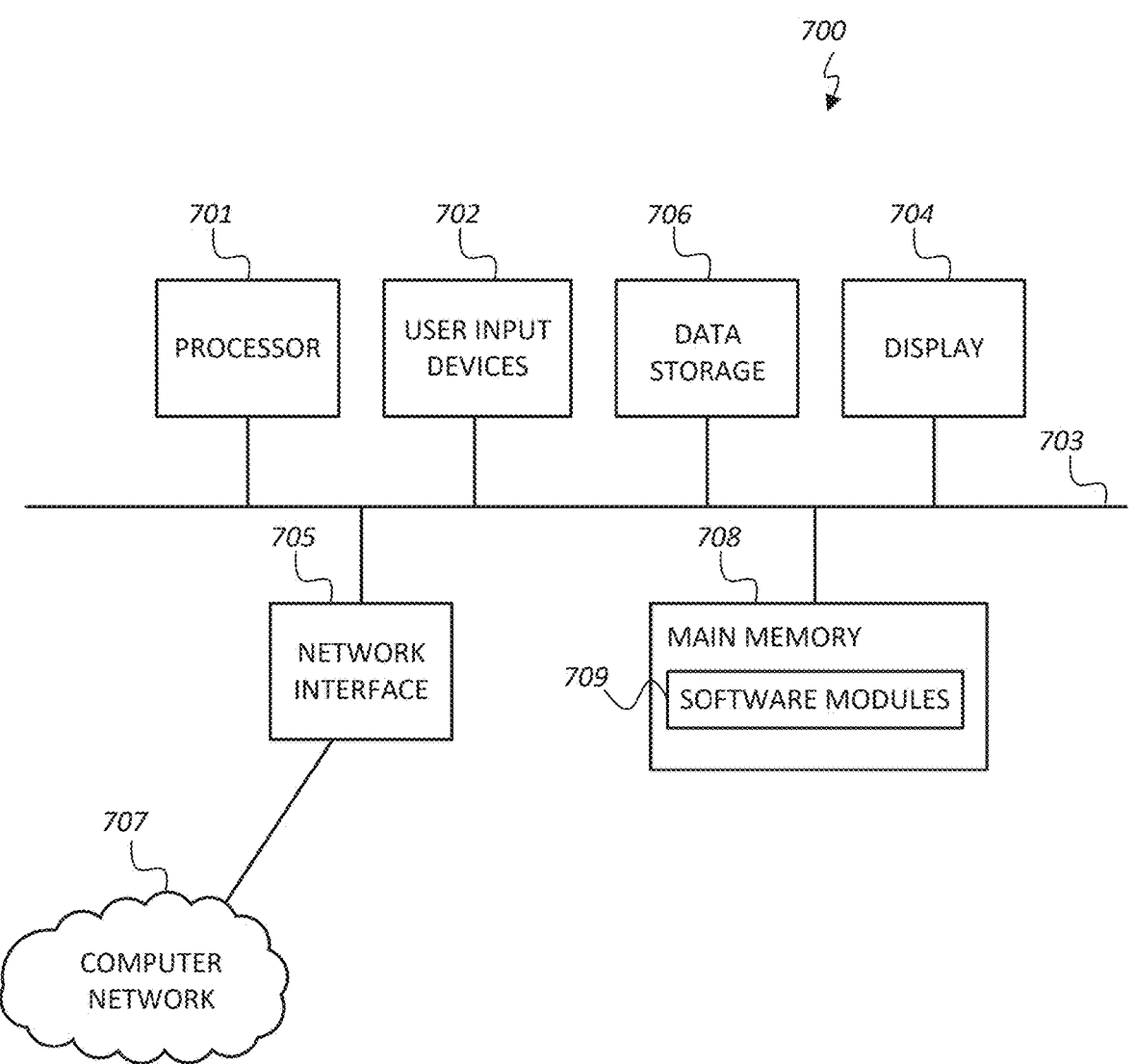
FIG. 17 shows a block diagram of a computer system that may be employed with embodiments of the present invention.

FIG. 17 shows a block diagram of a computer system 700 that may be employed with embodiments of the present invention. The computer system 700 may be employed as a backend system or other computer described herein. The computer system 700 may have fewer or more components to meet the needs of a particular cybersecurity application. The computer system 700 may include one or more processors 701. The computer system 700 may have one or more buses 703 coupling its various components. The computer system 700 may include one or more user input devices 702

(e.g., keyboard, mouse), one or more data storage devices 706 (e.g., hard drive, optical disk, solid state drive), a display screen 704 (e.g., liquid crystal display, flat panel monitor), a computer network interface 705 (e.g., network adapter, modem), and a main memory 708 (e.g., random access memory). The computer network interface 705 may be coupled to a computer network 707, which in this example includes the Internet.

The computer system 700 is a particular machine as programmed with one or more software modules 709, comprising instructions stored non-transitory in the main memory 708 for execution by at least one processor 701 to cause the computer system 700 to perform corresponding programmed steps. An article of manufacture may be embodied as computer-readable storage medium including instructions that when executed by at least one processor 701 cause the computer system 700 to be operable to perform the functions of the one or more software modules 709. In one embodiment where the computer system 700 is configured as a backend system, the software modules 709 comprises pseudo-malware generation modules.

A system and method of black box testing a cybersecurity system have been disclosed. While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of black box testing a cybersecurity system, the method comprising:
   decomposing an attack modality into a plurality of primitives, the attack modality is a method that an attacker employs as part of a cyberattack, each of the plurality of primitives is a step of the method that the attacker employs as part of the cyberattack;
   for each primitive of the plurality of primitives, generating a prompt that instructs a large language model (LLM) to output a primitive code for the primitive;
   assembling primitive codes into an assembled code that is used as a pseudo-malware, the primitive codes are output by the LLM responsive to corresponding prompts of the plurality of primitives; and
   black box testing a malware scanning engine against the pseudo-malware to determine whether the malware scanning engine can detect the pseudo-malware.

2. The method of claim 1, further comprising:
   raising an alert responsive to the malware scanning engine failing to detect the pseudo-malware.

3. The method of claim 1, further comprising:
   decomposing an attack chain into a plurality of stages; and
   decomposing a stage of the plurality of stages into a plurality of attack modalities that include the attack modality.

4. The method of claim 1, wherein the attack modality is a MITRE ATT&CK technique.

5. The method of claim 4, wherein the MITRE ATT&CK technique is Technique T1547, which is "Boot or Logon Autostart Execution".

6. The method of claim 4, wherein the MITRE ATT&CK technique is Technique T1550.003, which is "Use Alternate Authentication Material: Pass the Ticket".

7. The method of claim 1, further comprising:
   runtime testing the assembled code; and
   using the assembled code as the pseudo-malware responsive to the assembled code passing the runtime testing.

8. The method of claim 1, further comprising:

runtime testing the assembled code; and correcting the assembled code responsive to the assembled code failing the runtime testing.

9. The method of claim 8, further comprising:

prompting the LLM or another LLM to correct an error in the assembled code, wherein a prompt that is used for the prompting of the LLM or the other LLM to correct the error in the assembled code includes error information from the runtime testing.

10. A computer system comprising at least one processor and a memory, the memory storing instructions that when executed by the at least one processor cause the computer system to:

decompose an attack modality into a plurality of primitives, the attack modality is a method that an attacker employs as part of a cyberattack, each of the plurality of primitives is a step of the method that the attacker employs as part of the cyberattack;

for each primitive of the plurality of primitives, generate a prompt that instructs a large language model (LLM) to generate a primitive code for the primitive;

assemble primitive codes into an assembled code that is used as a pseudo-malware, the primitive codes are output by the LLM responsive to corresponding prompts of the plurality of primitives; and determine whether a malware scanning engine can detect the pseudo-malware.

11. The computer system of claim 10, wherein the instructions stored in the memory when executed by the at least one processor cause the computer system to:

raise an alert responsive to the malware scanning engine failing to detect the pseudo-malware as malware.

12. The computer system of claim 10, wherein the instructions stored in the memory when executed by the at least one processor cause the computer system to:

decompose an attack chain into a plurality of stages; and decompose a stage of the plurality of stages into a plurality of attack modalities that include the attack modality.

13. The computer system of claim 10, wherein the attack modality is a MITRE ATT&CK Technique.

14. The computer system of claim 10, wherein the attack modality is MITRE ATT&CK Technique T1547, which is "Boot or Logon Autostart Execution".

15. The computer system of claim 10, wherein the instructions stored in the memory when executed by the at least one processor cause the computer system to:

runtime test the assembled code; and correct the assembled code responsive to the assembled code failing the runtime test.

16. The computer system of claim 15, wherein the instructions stored in the memory when executed by the at least one processor cause the computer system to correct the assembled code by:

prompting the LLM or another LLM to correct an error in the assembled code, wherein a prompt that is used to prompt the LLM or the other LLM to correct the error in the assembled code includes error information from the runtime testing.

17. A method of black box testing a cybersecurity system, the method comprising:

decomposing an attack modality into a plurality of primitives, the attack modality is a method that an attacker employs as part of a cyberattack, each of the plurality of primitives is a step of the method that the attacker employs as part of the cyberattack;

for each primitive of the plurality of primitives, using a generative artificial intelligence (AI) model to generate a primitive code;

assembling primitive codes generated by the AI model into a pseudo-malware; and black box testing a cybersecurity system against the pseudo-malware.

18. The method of claim 17, wherein the generative AI model is a large language model (LLM).

19. The method of claim 17, further comprising:

for each primitive of the plurality of primitives, generating a prompt that instructs the AI model to generate a corresponding primitive code; and inputting the prompt to the AI model.

20. The method of claim 17, wherein the attack modality is a MITRE ATT&CK Technique.

\* \* \* \* \*